US012147893B2

(12) United States Patent
Buggins et al.

(10) Patent No.: US 12,147,893 B2
(45) Date of Patent: Nov. 19, 2024

(54) ANOMALY DETECTION IN NETWORK TOPOLOGY

(71) Applicant: International Business Machines Corporation, Armonk, NY (US)

(72) Inventors: Jack Richard Buggins, London (GB); Luke Taher, Heswall (GB); Vinh Tuan Thai, Markham (CA); Ian Manning, Church Hill (IE)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 16/928,474

(22) Filed: Jul. 14, 2020

(65) Prior Publication Data

US 2022/0019887 A1 Jan. 20, 2022

(51) Int. Cl.
*G06N 3/08* (2023.01)
*G06N 3/044* (2023.01)
*G06N 20/00* (2019.01)

(52) U.S. Cl.
CPC ............... *G06N 3/08* (2013.01); *G06N 3/044* (2023.01); *G06N 20/00* (2019.01)

(58) Field of Classification Search
CPC .......... G06N 3/08; G06N 3/044; G06N 20/00; G06N 3/045
See application file for complete search history.

(56) References Cited

U.S. PATENT DOCUMENTS

| 8,738,972 | B1 | 5/2014 | Bakman |
| 8,930,964 | B2 | 1/2015 | Balakrishnan |
| 9,679,243 | B2 | 6/2017 | Zou |
| 10,212,044 | B2 | 2/2019 | Mermoud |
| 10,216,828 | B2 | 2/2019 | Singh |
| 11,107,007 | B2 | 2/2021 | Zheng |
| 2017/0010931 | A1 | 1/2017 | Agarwal |
| 2017/0032273 | A1 | 2/2017 | Ho |

(Continued)

FOREIGN PATENT DOCUMENTS

| CN | 106603293 A | 4/2017 |
| CN | 109102023 A | 12/2018 |

(Continued)

OTHER PUBLICATIONS

Yu, Wenchao, et al. "Netwalk: A flexible deep embedding approach for anomaly detection in dynamic networks." Proceedings of the 24th ACM SIGKDD international conference on knowledge discovery & data mining. 2018. (Year: 2018).*

(Continued)

*Primary Examiner* — Michael J Huntley
*Assistant Examiner* — Sehwan Kim
(74) *Attorney, Agent, or Firm* — Monchai Chuaychoo

(57) ABSTRACT

An approach for training a recurrent neural network to create a model for anomaly detection in the topology of a network is disclosed. The approach comprises, creating an embedding vector for each resource in the network based on applying an embedding algorithm to each resource of the network. A feature vector is then created for each change to a resource in the network based on one or more properties of the change. A recurrent neural network can thus be trained with the embedding vectors and the feature vectors to create a model for anomaly detection in the topology of the network.

20 Claims, 6 Drawing Sheets

(56) References Cited

U.S. PATENT DOCUMENTS

| | | | |
|---|---|---|---|
| 2017/0279830 A1 | 9/2017 | Mermoud | |
| 2017/0315795 A1 | 11/2017 | Keller | |
| 2018/0336081 A1 | 11/2018 | Tee | |
| 2019/0165988 A1 | 5/2019 | Wang | |
| 2020/0076841 A1 | 3/2020 | Hajimirsadeghi | |
| 2020/0076842 A1 | 3/2020 | Zhou | |
| 2020/0107072 A1 | 4/2020 | Lomada | |
| 2020/0175161 A1* | 6/2020 | Giaconi | G06N 3/084 |
| 2021/0042515 A1* | 2/2021 | Anderson | G06F 40/30 |
| 2021/0374522 A1* | 12/2021 | Huang | G06Q 50/60 |

FOREIGN PATENT DOCUMENTS

| | | |
|---|---|---|
| CN | 109636049 A | 4/2019 |
| CN | 110969015 A | 4/2020 |
| CN | 111291932 A | 6/2020 |
| WO | 2022013662 A1 | 1/2022 |

OTHER PUBLICATIONS

Bhatia, Parminder, Marsal Gavalda, and Arash Einolghozati. "soc2seq: Social embedding meets conversation model." arXiv preprint arXiv:1702.05512 (2017). (Year: 2017).*

Du, Min, et al. "Deeplog: Anomaly detection and diagnosis from system logs through deep learning." Proceedings of the 2017 ACM SIGSAC conference on computer and communications security. 2017. (Year: 2017).*

Sun, Fangzhou, Abhishek Dubey, and Jules White. "DxNAT—Deep neural networks for explaining non-recurring traffic congestion." 2017 IEEE International Conference on Big Data (Big Data). IEEE, 2017. (Year: 2017).*

Bis, Daniel, et al. "Layered multistep bidirectional long short-term memory networks for biomedical word sense disambiguation." 2018 IEEE International Conference on Bioinformatics and Biomedicine (BIBM). IEEE, 2018. (Year: 2018).*

Chen, Jinyin, et al. "E-LSTM-D: A deep learning framework for dynamic network link prediction." IEEE Transactions on Systems, Man, and Cybernetics: Systems 51.6 (2019): 3699-3712. (Year: 2019).*

Khoshraftar, Shima, et al. "Dynamic graph embedding via lstm history tracking." 2019 IEEE International Conference on Data Science and Advanced Analytics (DSAA). IEEE, 2019. (Year: 2019).*

Goyal, Palash, et al. "Dyngem: Deep embedding method for dynamic graphs." arXiv preprint arXiv:1805.11273 (2018). (Year: 2018).*

Taheri, Aynaz, Kevin Gimpel, and Tanya Berger-Wolf. "Learning to represent the evolution of dynamic graphs with recurrent models." Companion proceedings of the 2019 world wide web conference. 2019. (Year: 2019).*

Kasongo SM, Sun Y. A deep long short-term memory based classifier for wireless intrusion detection system. ICT Express. Jun. 1, 2020;6(2):98-103. (Year: 2020).*

International Search Report and Written Opinion, International Application No. PCT/IB2021/055808, International Filing Date Jun. 29, 2021.

"One-hot", Wikipedia, last edited on Jan. 20, 2020, 3 pages, <https://en.wikipedia.org/wiki/One-hot>.

"Text generation with an RNN", TensorFlow, last updated Apr. 1, 2020, 20 pages, <https://www.tensorflow.org/tutorials/text/text_generation>.

"tf.keras.layers.Dense", TensorFlow, last updated Mar. 31, 2020, 3 pages, <https://www.tensorflow.org/api_docs/python/tf/keras/layers/Dense>.

Bontemps et al., "Collective Anomaly Detection based on Long Short Term Memory Recurrent Neural Network", downloaded from the internet on Apr. 7, 2020, 12 pages, <https://arxiv.org/ftp/arxiv/papers/1703/1703.09752.pdf>.

Cohen, "node2vec: Embeddings for Graph Data", Towards Data Science, Apr. 16, 2018, 11 pages, <https://towardsdatascience.com/node2vec-embeddings-for-graph-data-32a866340fef>.

De Winter et al., "Combining Temporal Aspects of Dynamic Networks with node2vec for a more Efficient Dynamic Link Prediction", DyNo Workshop ASONAM, Aug. 28, 2018, 28 pages, <http://dyno.sci-web.net/keynotes/DeWinter.pdf>.

Dong et al., "metapath2vec: Scalable Representation Learning for Heterogeneous Networks", Conference on Knowledge Discovery and Data Mining (KDD), Aug. 13-17, 2017, 10 pages, Halifax, NS, Canada, <https://ericdongyx.github.io/papers/KDD17-dong-chawla-swami-metapath2vec.pdf>.

Gartley et al., "Topological Anomaly Detection Performance with Multispectral Polarimetric Imagery", Proceedings of SPIE, 2009, 12 pages, vol. 7334 73341O-1, <http://www.cis.rit.edu/~mxgpci/pubs/gartley-7334-1.pdf>.

Grover et al., "node2vec: Scalable Feature Learning for Networks," KDD '16: Proceedings of the 22nd ACM SIGKDD International Conference on Knowledge Discovery and Data Mining, Aug. 13-17, 2016, pp. 855-864, San Francisco, CA, USA, DOI: 10.1145/2939672.2939754.

Jin et al., "Learning Graph-Level Representations with Recurrent Neural Networks", arXiv:1805.07683v4 [cs.LG], Sep. 13, 2018, 16 pages, <https://arxiv.org/pdf/1805.07683.pdf>.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

Nguyen et al., "Continuous-Time Dynamic Network Embeddings", WWW '18 Companion, Proceedings of The Web Conference (WWW), Apr. 23-27, 2018, 8 pages, Lyon, France, <http://ryanrossi.com/pubs/nguyen-et-al-WWW18-BigNet.pdf>.

Noble et al., "Graph-Based Anomaly Detection", Special Interest Group on Knowledge Discovery and Data Mining (SIGKDD), Aug. 24-27, 2003, 7 pages, Washington, DC, USA, <http://www.ailab.wsu.edu/subdue/papers/NobleKDD03.pdf>.

The First Office Action, CN Application No. 202180060830.1, Dated Jun. 25, 2024, 8 pages.

* cited by examiner

ANOMALY DETECTION IN NETWORK TOPOLOGY

BACKGROUND

The present invention relates generally to anomaly detection in the topology of a network, and more particularly to a method for training a recurrent neural network to create a model for anomaly detection in the topology of a network.

Modern computing network environments that include interconnected network resources for storage, processing and communication of data often change dynamically over time. This can be particularly true in virtualized network environments, in which multiple isolated virtualized resources can be created and run independently within a single physical resource. Examples of such virtualized resources, also known as "user-space instances," can include virtual machines and containers. Virtualized resources can be created on a network for a particular purpose and then removed once the purpose is fulfilled. For example, one or more replicas of a virtualized resource can be dynamically created during times of high demand and subsequently removed when demand returns to normal, for the purpose of load balancing. Similarly, additional replicas of a virtualized resource can be created for the purpose of horizontal scaling. Thus, in virtualized network environments, for example implementing containerization style orchestration, e.g., using docker containers or Kubernetes, are dynamic in the sense that they undergo changes in network topology over time and such changes can occur frequently.

For anomaly detection in a network, it is desirable to correlate network resources and their associated data, such as data records relating to the network resources. However, anomaly detection in virtualized network environments is challenging due to the dynamically changing network resources and network topology. In particular, a single real resource performing a particular role, can correspond to multiple virtualized resources each having a different identifier or label. Thus, anomalies detected relating to a real resource performing a particular service can originate from multiple different and dynamically changing resources (e.g., replicas) and therefore include multiple different and dynamically changing resource identifiers or labels.

Service Management tools are typically deployed to monitor the health of networks, IT environments, and applications. Those tools typically poll for availability or monitor Key Performance Indicators (KPIs) to assess the health. Alternatively, the equipment itself may emit an event to indicate that it requires attention, or it may push information to a log which can then be monitored for the presence of key words so that the operator is aware and can take action.

SUMMARY

Aspects of the present invention disclose a computer-implemented method, an apparatus and computer program product for training a recurrent neural network to create a model for anomaly detection in the topology of a network. The computer implemented method may be implemented by one or more computer processors and may include creating an embedding vector for each resource in the network based on applying the KubeNode2Vec method to the network; creating a feature vector for each change to a resource in the network based on one or more properties of the change; and training a recurrent neural network with the embedding vectors and the feature vectors to create a model for anomaly detection in the topology of the network.

In an embodiment, the apparatus may include: a preprocessor configured to: create an embedding vector for each resource in the network based on applying the KubeNode2Vec method to the network; and create a feature vector for each change to a resource in the network based on one or more properties of the change, and a training processor configured to train a recurrent neural network with the embedding vectors and the feature vectors to create a model for anomaly detection in the topology of the network.

In another embodiment, the computer program product may include one or more non-transitory computer readable storage media and program instructions stored on the one or more non-transitory computer readable storage media, the program instructions comprising: program instructions to create an embedding vector for each resource in the network based on applying the KubeNode2Vec method to the network; program instructions to create a feature vector for each change to a resource in the network based on one or more properties of the change; and program instructions to train a recurrent neural network with the embedding vectors and the feature vectors to create a model for anomaly detection in the topology of the network.

BRIEF DESCRIPTION OF THE DRAWINGS

Preferred embodiments of the present invention will now be described, by way of example only, with reference to the following drawings, in which.

DETAILED DESCRIPTION

Figure 1:
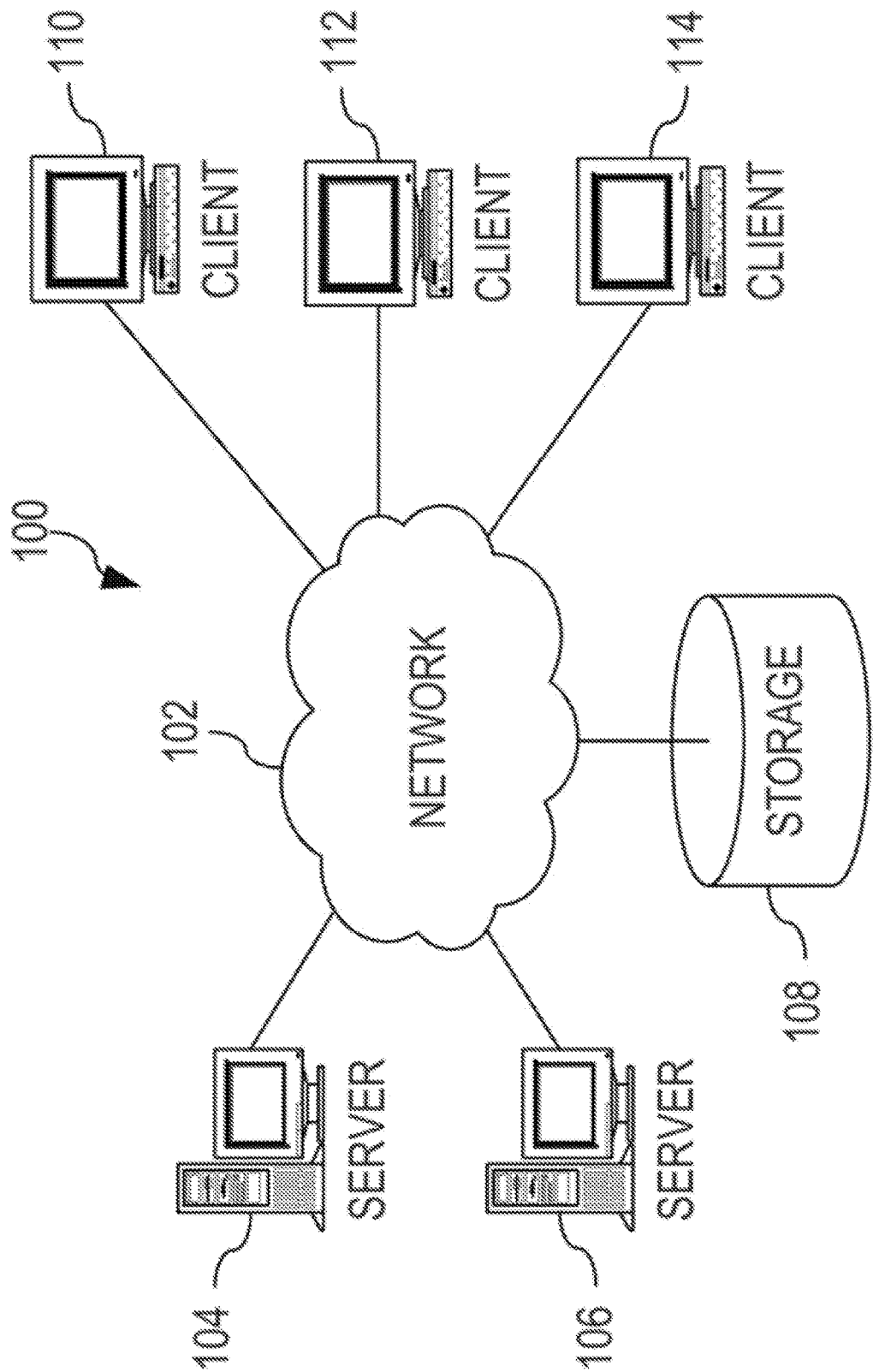
FIG. 1 depicts a pictorial representation of an exemplary distributed system in which aspects of the illustrative embodiments of the present invention may be implemented.

Embodiments of the present invention provides an approach for a for training a recurrent neural network to create a model for anomaly detection in the topology of a network. The training method comprises creating an embedding vector for each resource in the network based on applying the KubeNode2Vec method to the network, creating a feature vector for each change to a resource in the network based on one or more properties of the change and training a recurrent neural network with the embedding vectors and the feature vectors to create a model for anomaly detection in the topology of the network.

The embodiments may allow a recurrent neural network (RNN) to learn topological changes of a network by learning from the embedding of resources and the changes to the resources. The RNN can thus learn the temporal topological changes, for example, by using sequence learning for the embedding of resources, which is augmented with the feature vectors which contain information on change properties.

The KubeNode2Vec embedding method is able to utilize historical changes to a topology to learn abstract temporal relationships, and thus increase the accuracy of the RNN to detect anomalies. Additionally, the method can be used on resources that have never been seen before, catering for the dynamic nature of the topology over time. This is particularly useful in Kubernetes when using autoscaling (e.g., cluster autoscaling or horizontal pod autoscaling) as replicas of pods and/or new nodes may be created depending on the needs of the cluster. Thus, the embedding of the dynamic environment is better described using KubeNode2Vec.

The embodiment may be a sequence learning approach which is augmented with auxiliary data. The advantage of this approach is that it can detect abnormal changes on the topology of dynamic environments by taking into account not just whether a change is sensible based on what other changes happened before it from the learned history, but also other important characteristics of a change.

In some embodiments, creating a feature vector is based on one-hot encoding or one-cold encoding the corresponding change properties.

One-hot encoding (or one-cold encoding) can allow all the data of a particular feature (change property) to be categorized without giving any one of the categories a higher value. If, instead, label encoding was used, this can give the last category with label n (out of n labels) a higher number and thus a disproportionate importance when analyzed by a machine learning algorithm (e.g., n>1, n>n−1 etc.).

The present invention can also provide an apparatus configured to train a recurrent neural network to create a model for anomaly detection in the topology of a network. The apparatus can comprise a pre-processor configured to create an embedding vector for resources in the network based on applying an embedding algorithm to the resources of the network and can create a feature vector for changes to a resource in the network based on one or more properties of the change. The apparatus can also comprise a training processor configured to train a recurrent neural network with the embedding vectors and the feature vectors to create a model for anomaly detection in the topology of the network.

These and other aspects of the invention will be apparent from and elucidated with reference to the embodiment(s) described hereinafter.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

The KubeNode2Vec embedding method can utilize historical changes to a topology to learn abstract temporal relationships, and thus increase the accuracy of the RNN to detect anomalies. Additionally, the method can be used on resources that have never been seen before, such as replicas of a pod or a node. This is particularly useful in Kubernetes when using autoscaling (e.g., cluster autoscaling or horizontal pod autoscaling) as replicas of pods and/or new nodes may be created dynamically.

The method can additionally be augmented with auxiliary data. The advantage of this approach is that it can detect abnormal changes on the topology of dynamic environments by taking into account not just whether a change is sensible based on what other changes happened before it (from the learned history), but also other important characteristics of a change.

In some embodiments, the recurrent neural network comprises an input layer for receiving the embedding vectors; a learning layer following the input layer; a concatenating layer for concatenating the feature vectors with the output of the sequence learning layer; one or more dense layers; and an output layer to output the model for anomaly detection.

For example, the input layer of the RNN may be five embedding vectors corresponding to five pods in a sequence of changes for the embedding vectors. Thus, the RNN can learn sequences of five embedding vectors and the corresponding feature vectors at the same time. A sequence learning layer can be used to maintain some memory of previous sequences of embedding vectors (change sequences). The output of the sequence learning layer thus can contain information on the change, which is being processed, as well as the previous changes in the sequence (of five).

The output of the sequence learning layer can be concatenated with the feature vectors corresponding to the change properties. Thus, the one or more dense layers may learn from the sequence of changes and the change properties of the change being processed. This means that the RNN can learn to detect abnormal changes in the topology of the network (dynamic environment) based on the topology changes and the change properties.

Therefore, the RNN is able to learn from the embedding of vectors (based on past embedding) and thereafter learn the features (e.g., time of change, date of change etc.) corresponding to the change sequences. The RNN can thus be trained to output a model of probabilities which corresponds to possible future changes (and the respective probabilities). Anomalies can then be detected, for example, by observing a change and the corresponding probability of that change occurring. A threshold probability could be set to detect anomalies (e.g., anomaly is based on probability <1%).

In some embodiments, the change properties are one or more of an entity type corresponding to the resource where the change was made; a change type; and a change time.

Based on the different change properties chosen, the RNN can learn different abstract relationships between these changes. The different change properties may be chosen depending on the user preference or the anomalies to be detected. In another example, CPU percentage usage may be a change property in order to detect anomalies in the CPU usage (e.g., anomaly is based on CPU usage >80%). In yet another example, the RNN may learn that a certain change type is made on a Wednesday every week. Thus, an anomaly may be detected if the expected change is seen on a Wednesday.

In some embodiments, creating a feature vector can be based on one-hot encoding or one-cold encoding the corresponding change properties. One-hot encoding (or one-cold encoding) allows all the data of a particular feature (change property) to be categorized without giving any one of the categories a higher value.

The RNN could also learn that there are more changes during certain time periods. Thus, if during the specified busy time periods not many changes are seen, this may signal an anomaly in the topology of the network. For example, many nodes may join a cluster on weekdays, but not on weekends. If an abnormal number of nodes join during a Saturday, this may be flagged as an anomaly.

In some embodiments, the sequence learning layer can be a long short-term memory (LSTM), LSTM layer or gated recurrent unit (GRU) layer. LSTMs use feedback connections to process sequences of data and are well suited for making predictions and determining probabilities of events occurring. Additionally, LSTMs provide an excellent "memory" when long sequences are required to be learned.

In some embodiments, the sequence learning layer can be a gated recurrent unit, GRU, layer. GRUs are typically faster to train than LSTMs and can, in some circumstances, outperform LSTMs. Additionally, GRUs are simpler than LSTMs and can be much more simply modified.

In some embodiments, training the recurrent neural network can be based on sequence learning. Sequence learning, such as sequence-to-sequence (Seq2Seq), can be used for training a machine learning algorithm to convert an input from one domain to another domain. A machine learning algorithm can thus be trained to receive the changes in a network topology and convert the changes into predictions of the next changes.

The present invention also can provide an apparatus configured to train a recurrent neural network to create a model for anomaly detection in the topology of a network. The apparatus can comprise a pre-processor configured to create an embedding vector for resources in the network based on applying an embedding algorithm to the resources of the network and can create a feature vector for changes to a resource in the network based on one or more properties of the changes. The apparatus also can comprise a training processor configured to train a recurrent neural network with the embedding vectors and the feature vectors to create a model for anomaly detection in the topology of the network.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed system 100. The network 102 may include connections, such as wire, wireless communication links, or fiber optic cables.

In the depicted example, a first server 104 and second server 106 are connected to the network 102 along with a storage system 108 which may, for example, comprise a RAID storage array formed of a plurality of storage units. However, other storage systems are envisaged. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major entities or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

The network 102 may be configured to perform one or more methods according to an embodiment of the invention, e.g., to control the storage of write data within the storage system 108.

Figure 2:
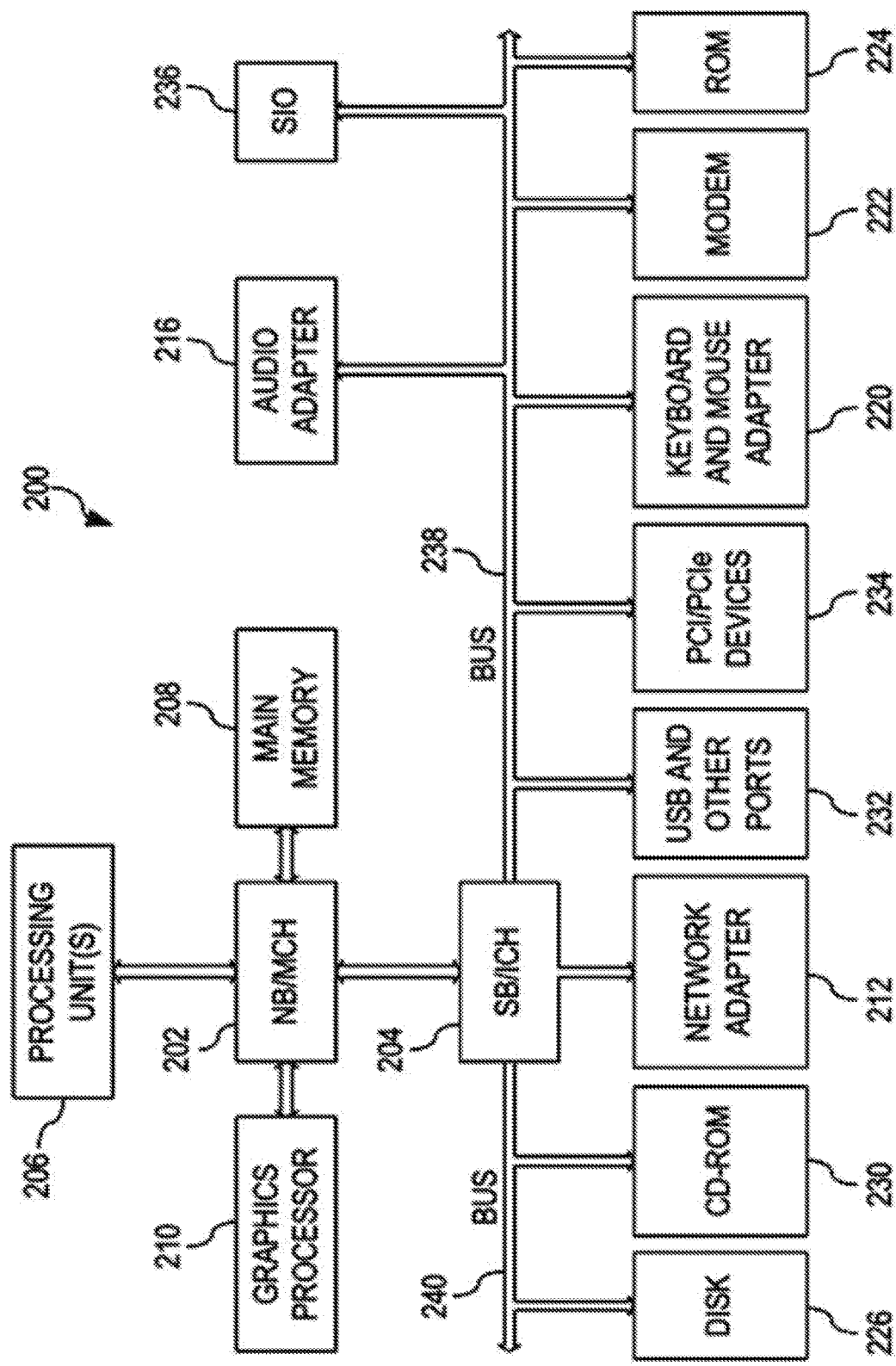
FIG. 2 is a block diagram of an example system in which aspects of the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, the system 200 may be configured to implement a pre-processor and a training processor according to an embodiment.

In the depicted example, the system 200 employs a hub architecture including a north bridge and memory controller hub (NB/MCH) 202 and a south bridge and input/output (I/O) controller hub (SB/ICH) 204. A processing system 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing system 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing system 206. Alternatively, a single processor system may be employed.

Instructions for the operating system, the programming system, and applications or programs are located on storage devices, such as HDD 226, and may be loaded into main memory 208 for execution by processing system 206. Similarly, one or more message processing programs according to an embodiment may be adapted to be stored by the storage devices and/or the main memory 208.

The processes for illustrative embodiments of the present invention may be performed by processing system 206 using computer usable program code, which may be located in a memory such as, for example, main memory 208, ROM 224, or in one or more peripheral devices HDD 226 and CD-ROM drive 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
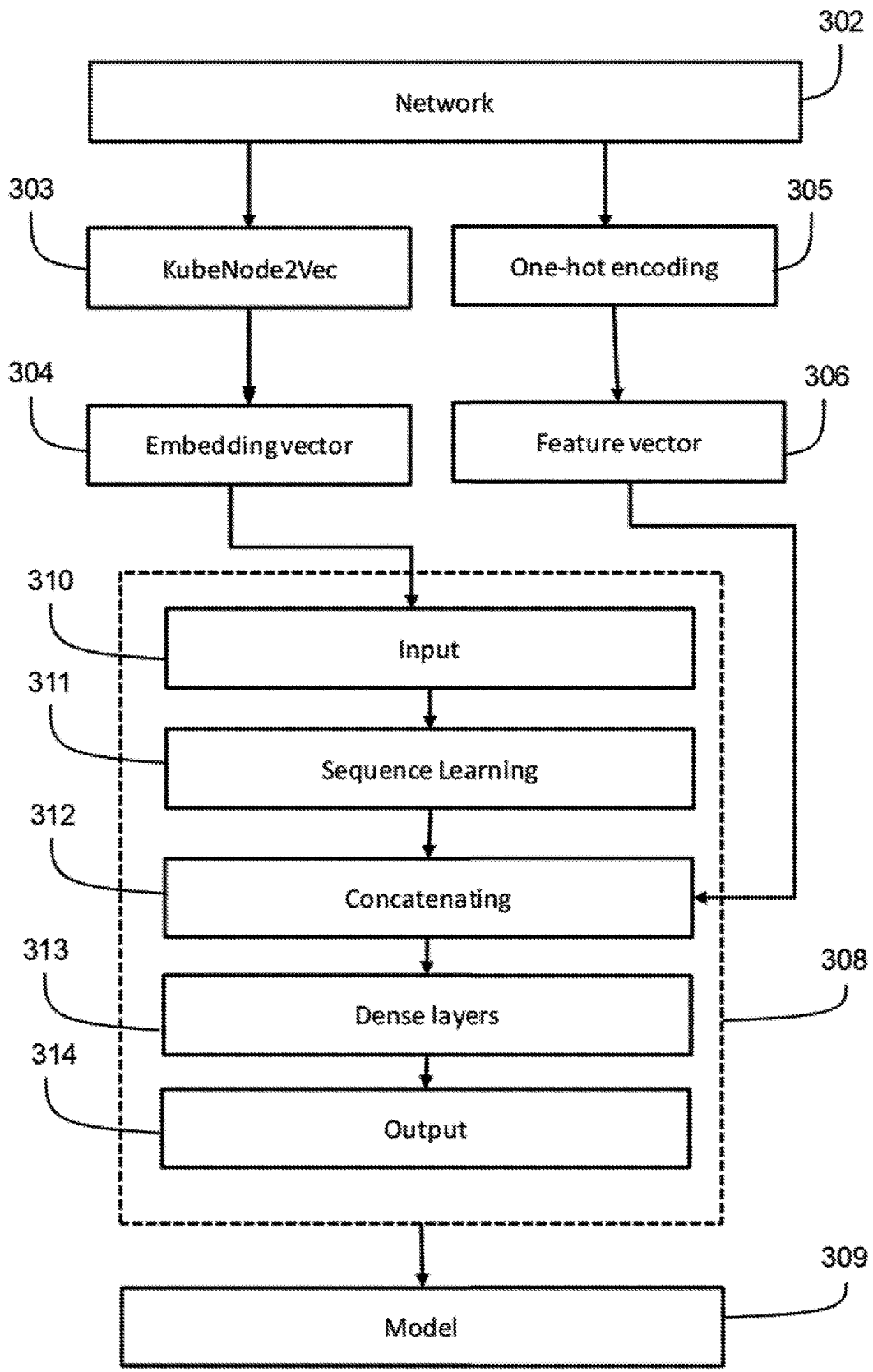
FIG. 3 shows a proposed computer implemented method for training a recurrent neural network to create a model for anomaly detection in the topology of a network according to an embodiment of the present invention.

FIG. 3 shows a proposed computer implemented method for training a recurrent neural network 308 to create a model 309 for anomaly detection in the topology of a network 302. The recurrent neural network 308 may comprise an input layer 310, a sequence learning layer 311 (e.g., LSTM cells, GRU cells or any other sequence learning method etc.), a concatenating layer 312 for concatenating the feature vectors with the output of the sequence learning layer 311, one or more dense layers 313 and an output layer 314 to output the model 309 for anomaly detection. Training the recurrent neural network 308 can be done through sequence learning.

The method is based on creating an embedding vector 304 for resources in the network 302. The embedding vectors 304 can be created by applying the KubeNode2Vec method 303 to the resources of the network 302. Resources of the network 302 can be independent services which provide computing power/storage and/or any other computing service related to the use of networks. For example, a resource may be a node in the network 302.

Feature vectors 306 are also created from the network 302. The feature vectors 306 are based on properties of changes which occur to the topology of the network 302. The change properties may be, for example, an entity type (corresponding to the resource where the change was made), a change type or a change time (day of the week, time of change etc.). Creating the feature vectors 306 can be done by one-hot encoding 305 (or one-cold encoding).

A recurrent neural network 308 can thus be trained with the embedding vectors 304 and the feature vectors 306 to create a model for anomaly detection in the topology of the network 302.

Figure 4:
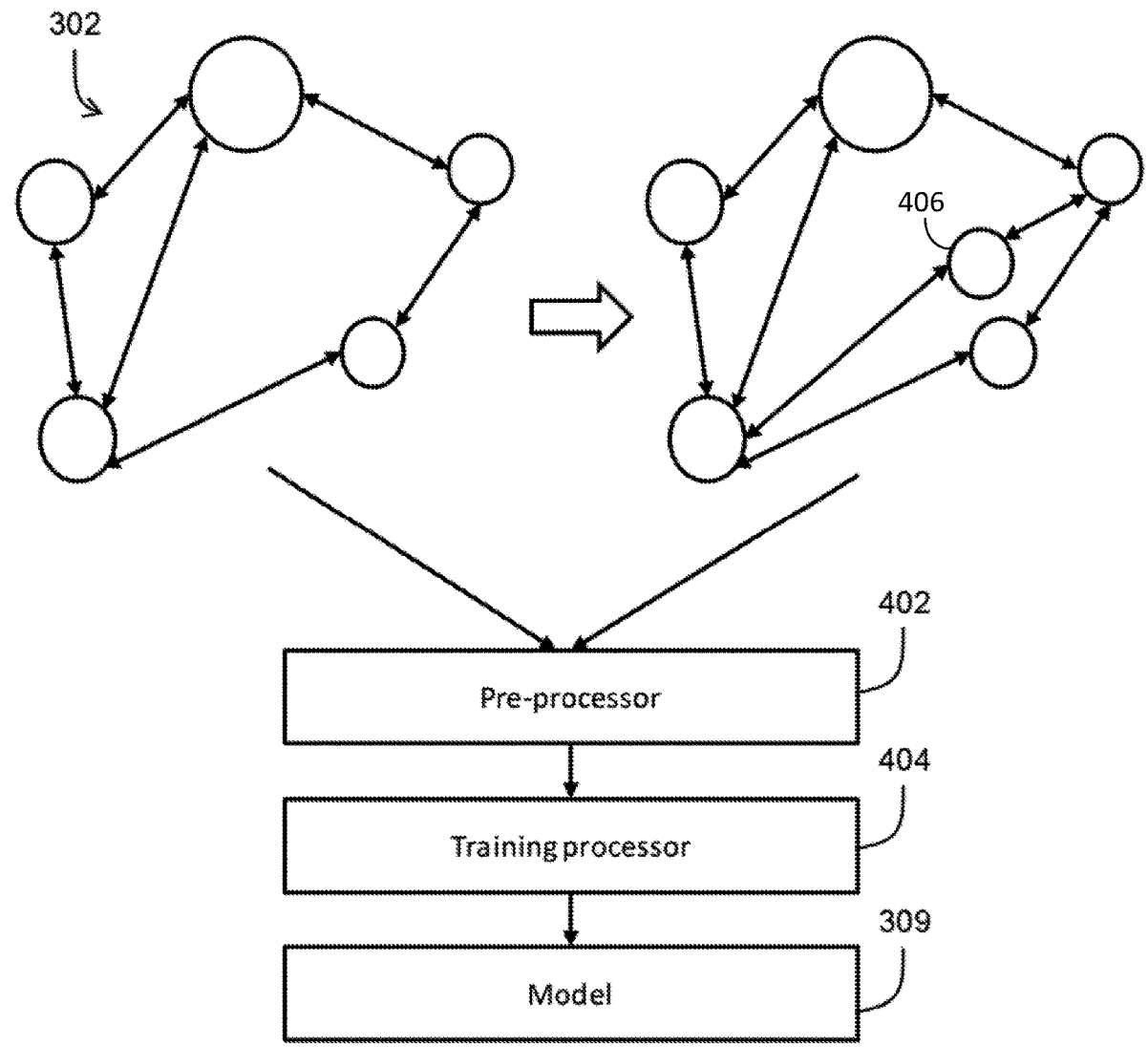
FIG. 4 shows an apparatus configured to train a recurrent neural network to create a model for anomaly detection in the topology of a network according to an embodiment of the present invention.

FIG. 4 shows an apparatus configured to train a recurrent neural network 308 to create a model 309 for anomaly detection in the topology of a network 302. The apparatus comprises a pre-processor 402 and a training processor 404. FIG. 4 shows a change to the topology of a network 302 by a new resource 406 being added to the network 302. This may be, for example, due to the replication of a current resource.

Changes to the topology of the network 302 (e.g., creating a replica pod) can be inputs to the pre-processor 402. The pre-processor 402 can create an embedding vector 304 for resources in the network 302 (e.g., pod/node/container) based on applying the KubeNode2Vec method to the resource in the network 302.

The pre-processor 402 also can create a feature vector 306 for changes to a resource in the network 302 based on one or more properties of the changes. The change properties may be, for example, an entity type (corresponding to the resource where the change was made), a change type or a change time (day of the week, time of change etc.). Creating the feature vectors 306 can be done by one-hot encoding or one-cold endcoding.

The training processor 404 can be configured to train a recurrent neural network with the embedding vectors 304 and the feature vectors 306 to create a model 309 for anomaly detection in the topology of the network 302. The recurrent neural network may contain an input layer for receiving sequences of embedding vectors 304, a sequence learning layer following the input layer (e.g., LSTM cells, GRU cells or any other sequence learning methods etc.), a concatenating layer for concatenating the feature vectors 306 with the output of the sequence learning layer, one or more dense layers and an output layer to output the model 309 for anomaly detection.

Embedding Vectors:

The embodiments of the present invention will be subsequently detailed based on the Kubernetes system. However, it should be noted that the embodiments are not limited to the Kubernetes system and can be used in other network architectures.

Given a history of a network's topology over time, the embedding of resources can be learned within the topology. This can be done via the KubeNode2Vec method—A method to utilize historical changes to a topology to learn abstract temporal relationships. The reason for selecting that approach is that it caters for the dynamic nature of the topology over time.

The KubeNode2Vec method can receive network topology information including historical snapshots of the topology of the network. The historical snapshots can include a most recent snapshot of the network topology and one or more previous historical snapshots of the network topology. In particular, snapshots can include network topology information for the arrangement of resources and connections of the network at a particular point in time. The network topology information can be obtained from a data storage having snapshot data received from a network topology discovery mechanism or the like. Any suitable network topology discovery mechanism can be used to capture and maintain the network topology information, including the historical snapshots. As one skilled in the art will appreciate, the topology of a dynamic network changes over time as resources are dynamically added to and removed from the network. Thus, raw network topology information obtained for a single snapshot, e.g., the most recent snapshot, cannot contain adequate information for deep learning in relation to the network. In accordance with the present disclosure, historical network topology information including multiple snapshots is used for deep learning. In particular, network topology information in historical snapshots can be used, for example, to identify stable parts of the network that can change minimally over time and, conversely, parts of the network that can change frequently over time. Thus, the use of historical snapshots provides richer topology information for facilitating improved learning about the features and behavior of the dynamic network.

The KubeNode2Vec method can identify two or more scale nodes that perform the same role, and are connected to the same set of non-scale nodes, in each snapshot of the network topology. In particular, it can compare nodes in each historical snapshot of the network topology with the other nodes in the same snapshot of the network topology. The KubeNode2Vec method can identify scale nodes in the network topology from data parameters of topology metadata associated with each resource or node, as described above. In addition, it can identify the role, e.g., function or purpose, of each identified scale node and its connections to non-scale nodes from the topology metadata. It can be understood that scale nodes that have both the same role and the same connection(s) to non-scale nodes in the network topology are performing the exact same role, or "functionality," in the network, e.g., as replicas for the purpose of load balancing etc. Thus, KubeNode2ec is able to identify groups of two or more scale nodes that perform the same role and are connected to the same non-scale nodes from the topology information. It can be understood that in any single snapshot of the network topology, multiple groups of scale nodes associated with different roles or services can be identified.

The KubeNode2Vec method can modify each network topology snapshot, by replacing scale nodes within a group of scale nodes having the same role and connected to the same set of non-scale nodes with a newly created, single aggregated node. The single aggregated node can have a new node identifier. Thus, KubeNode2Vec can modify each snapshot to derive modified topology information representing a modified network topology. The process of replacing the scale nodes with a single aggregated node is referred to herein as "collapsing scale nodes" and the single "aggregated node" is referred to herein as a "synthetic node." In example implementations, KubeNode2Vec can replace nodes belonging to an identified group of scale nodes with a single aggregated node. Thus, a group of scale nodes are associated with the same node identifier, i.e., a new identifier for the aggregated/synthetic node. In addition, KubeNode2Vec can replace the set of edges that start from scale nodes in a group of scale nodes with a single "aggregated edge," which can be weighted based on an average of the weights of the combined set of edges, or using another suitable technique for combining the edge weights. Thus, it modifies the network topology information of historical snapshots, by identifying "scale nodes" that perform the same role or service within the network, and collapsing them into a combined or aggregated node, so that they are treated as a single resource for the purposes of determining feature representations thereof. In example implementations, KubeNode2Vec can associate the original node identifier of scale nodes represented by an aggregated node with the corresponding aggregated node identifier. For example, it can store corresponding mapping information for mapping original node identifiers to aggregated node identifiers.

It can be understood that the KubeNode2Vec method can derive improved feature representations from nodes, i.e., network resources, in dynamic networks, such as in virtualized network environments, in which the topology of the network changes frequently with time. In particular, by deriving a common feature representation for scale nodes that perform the same role and are connected to the same set of non-scale nodes, the feature representations can be more readily used to associate and correlate resources, and associated data, in the network topology.

Below is pseudocode that adapts the Node2VEC algorithm for performing the KubeNode2Vec method, by way of illustration:

Prerequisite: Iterate, from the earliest time to the latest time, the network topology information that is available, collect all historical snapshots H over time to capture changes to the topology. Periodically, or each time a certain change happens, a snapshot H of the topology is captured, and a graph of that network topology snapshot is added to the collection, e.g., with an associated time stamp.

CollapseScaleNodes (Graph G=(V, E, W))

For a set s of "scale nodes" in V having the same role and connected to the same set of "non-scale nodes" ns Replace s with a single synthetic node Replace the edges in E which start from nodes within the set s to the set ns with an new edge. The weight of the new edge is the average of the original edges that are collapsed into it.

Return G

LearnFeatures (All historical snapshots H of topology, Dimensions d, number of Walks per node r, Walk length l, Context size k, Return p, In-out q)

For graphs G=(V, E, W) in the set of historical snapshots H of topology

Gc=CollapseScaleNodes(G)

π=PreprocessModifiedWeights(Gc, p, q)

G'=(V, E, π)

Initialize walks to Empty for iter=1 to r do for nodes u∈V do walk=node2vecWalk(G', u, l)

Append walk to walks f=StochasticGradientDescent(k, d, walks)

return f

```
node2vecWalk (Graph G'=(V, E, π), Start node u, Length l)
    Inititalize walk to [u]
        for walk_iter=1 to l do
            curr=walk[-1]
            Vcurr=GetNeighbors(curr, G')
            s=AliasSample(Vcurr, π)
            Append s to walk
    return walk
```
/*obtain a feature vector representing the neighbors of nodes in a walk using the same sampling strategy as during feature learning*/
```
generateNodeNeighborSignatures(Features f, Graph G'=(V, E, π))
    Initialize an empty map m from vectors to nodes
    For nodes v in G'
        nb=GetNeighbors(v, G')
        sig=average of feature vectors of neighbor nodes in nb
            after learning (available from f which is the result of
            invoking LearnFeatures above)
        Add (sig, v) to map m
    return map m
```
Change Sequence Dataset:

A change sequence dataset is constructed, iterating over all the historical changes to the network's topology and record them in a sequence, e.g.:

| PodID | Entity Type | ChangeType | Time | Day of Week |
|---|---|---|---|---|
| Pod1 | router | deleted | 5 pm | Monday |
| Pod3 | router | spun up | 5:01 pm | Monday |
| Pod8 | KafkaBus | spun up | 3:01 pm | Tuesday |
| Pod12 | KafkaBus | spun up | 3:01 pm | Tuesday |
| Pod15 | KafkaBus | spun up | 3:01 pm | Tuesday |
| . | . | . | . | . |
| . | . | . | . | . |
| . | . | . | . | . |
| Pod94 | CassandraDB | deleted | 9:01 am | Friday |

A sliding window of a predetermined size, e.g., 5, over each change is used to collect change sequences. For example, some sequences collected from the table are:

| Sequence 1: | Pod1 | Pod3 | Pod8 | Pod12 | Pod15 |
|---|---|---|---|---|---|
| Sequence 2: | Pod3 | Pod8 | Pod12 | Pod15 | ... |
| Sequence 3: | Pod8 | Pod12 | Pod15 | ... | ... |
| Sequence 4: | Pod12 | Pod15 | ... | ... | ... |
| . | . | . | . | . | . |
| . | . | . | . | . | . |
| . | . | . | . | . | . |
| Sequence n: | ... | ... | ... | ... | Pod94 |

The change sequences can be transformed such that the vector representations of the pods (embedding vectors of each pod) can be used instead of their IDs. After this transformation, a list of change sequences can be obtained, wherein change sequences are a sequence of embedding vectors.

Feature Dataset:

For change records, a feature vector can be constructed containing additional properties such as entity types, change types and temporal details. As entity types are of categorical nature, one-hot encoding (or one-cold encoding) can be used to create the feature vectors. Change types are also of categorical nature, and thus can allow the use of one-hot encoding. For temporal details, the time of day and day of the week can be treated as two separate fields. Similarly, one-hot encoding can be used to create feature vectors accordingly. An example of using one-hot encoding for the day of the week can be found in the following table:

| Date | One-hot |
|---|---|
| Monday | 0000001 |
| Tuesday | 0000010 |
| Wednesday | 0000100 |
| Thursday | 0001000 |
| Friday | 0010000 |
| Saturday | 0100000 |
| Sunday | 1000000 |

After constructing the one-hot vectors for the three aspects (time of day, day of week, change type), they can be appended together into a single feature vector. It should be noted that the features (change properties) are not limited to the three features mentioned and may include other metadata/properties, such as, but not limited to: geographical location, CPU percentage usage, RAM percentage usage, CPU temperature etc. For example, CPU usage could be categorized as "High", "Medium" or "Low" usage and then be one-hot encoded as "High"=001, "Medium"=010 or "Low"=100. "High" usage for the CPU could be, >75%, >80%, >85%, or any other percentage which one skilled in the art would be able to derive. Similarly, a CPU usage of <50%, <45%, <40% could be "Low" CPU usage. Alternatively, CPU usage could be categorized on a scale of 0% to 100% in steps of 1%, 5%, 10%, 20% etc.

Figure 5:
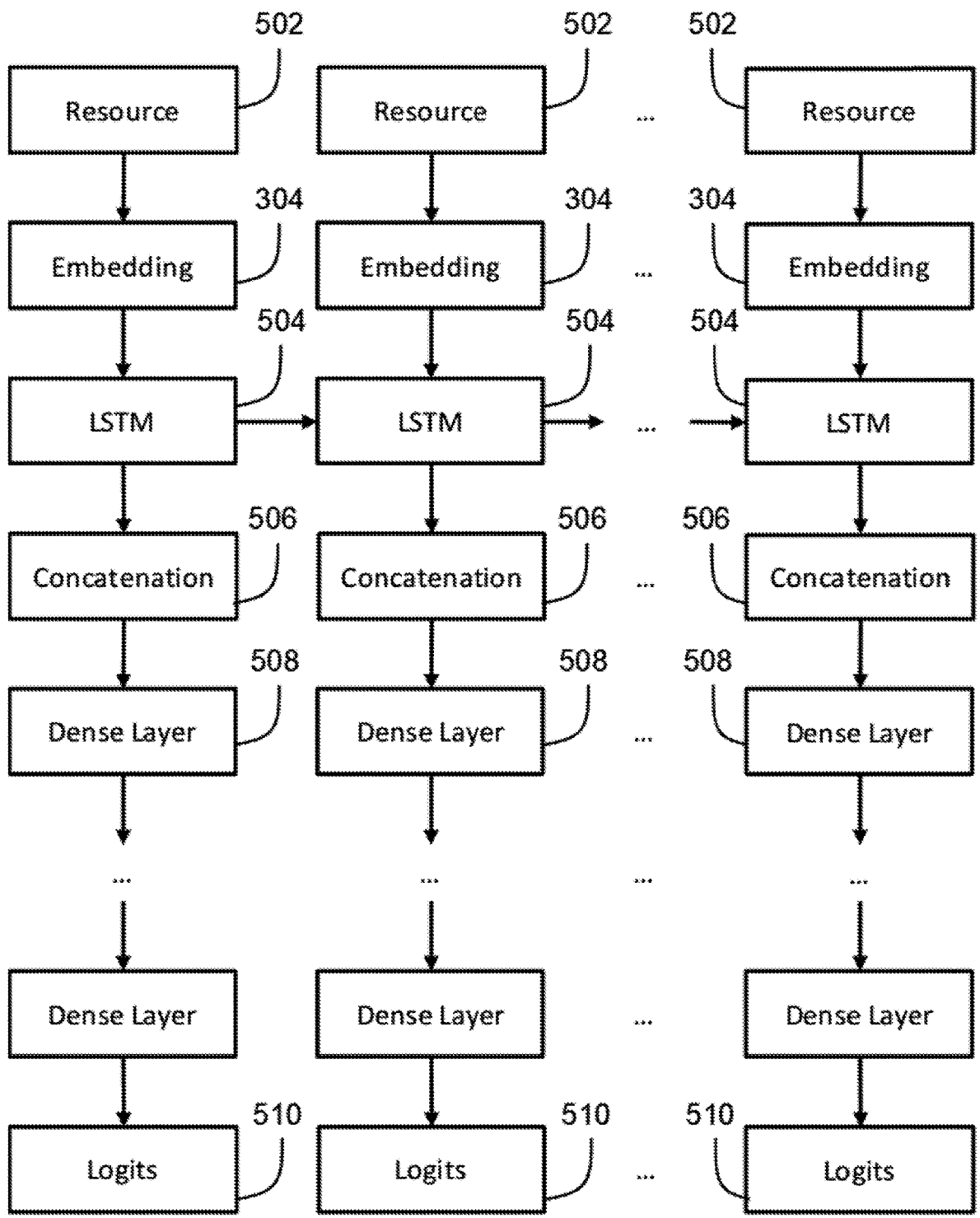
FIG. 5 shows an example of a neural network used to output a model for anomaly detection in accordance with an embodiment of the present invention.

Train Neural Network:

FIG. 5 shows an example of a neural network used to output a model 309 for anomaly detection. The resources 502 (e.g., a pod, a node, a container etc.) within a change sequence and their corresponding feature vectors 306 representing additional characteristics can be used to train a recurrent neural network.

In the example, the neural network is a recurrent neural network with Long Short-Term Memory (LSTM) cells 504. Resources 502 within change sequences of a fixed size can be fed into the neural network. The embedding vector 304 of resource 502 can be obtained via the KubeNode2Vec algorithm. This embedding vector 304 can be fed into an LSTM cell 504. Note that as is typical in a recurrent neural network, the output of the previous step LSTM cell 504 is fed into the next one in addition to the usual input at that time step.

At the time steps, the output of the LSTM cell 504 is concatenated with the corresponding feature vectors 306. By augmenting the LSTM output with the feature vectors 306, the network can learn any patterns related to entity types, change types, and temporal/seasonal patterns existing in the training data. Alternatively, GRU cells may be used instead of LSTMs.

The concatenated input vector 506 can be fed into one or more dense layers 508. The final output layer can contain the logits 510, which are the multinomial distributions that can be used to create the model 309 in order to predict the next change.

Figure 6:
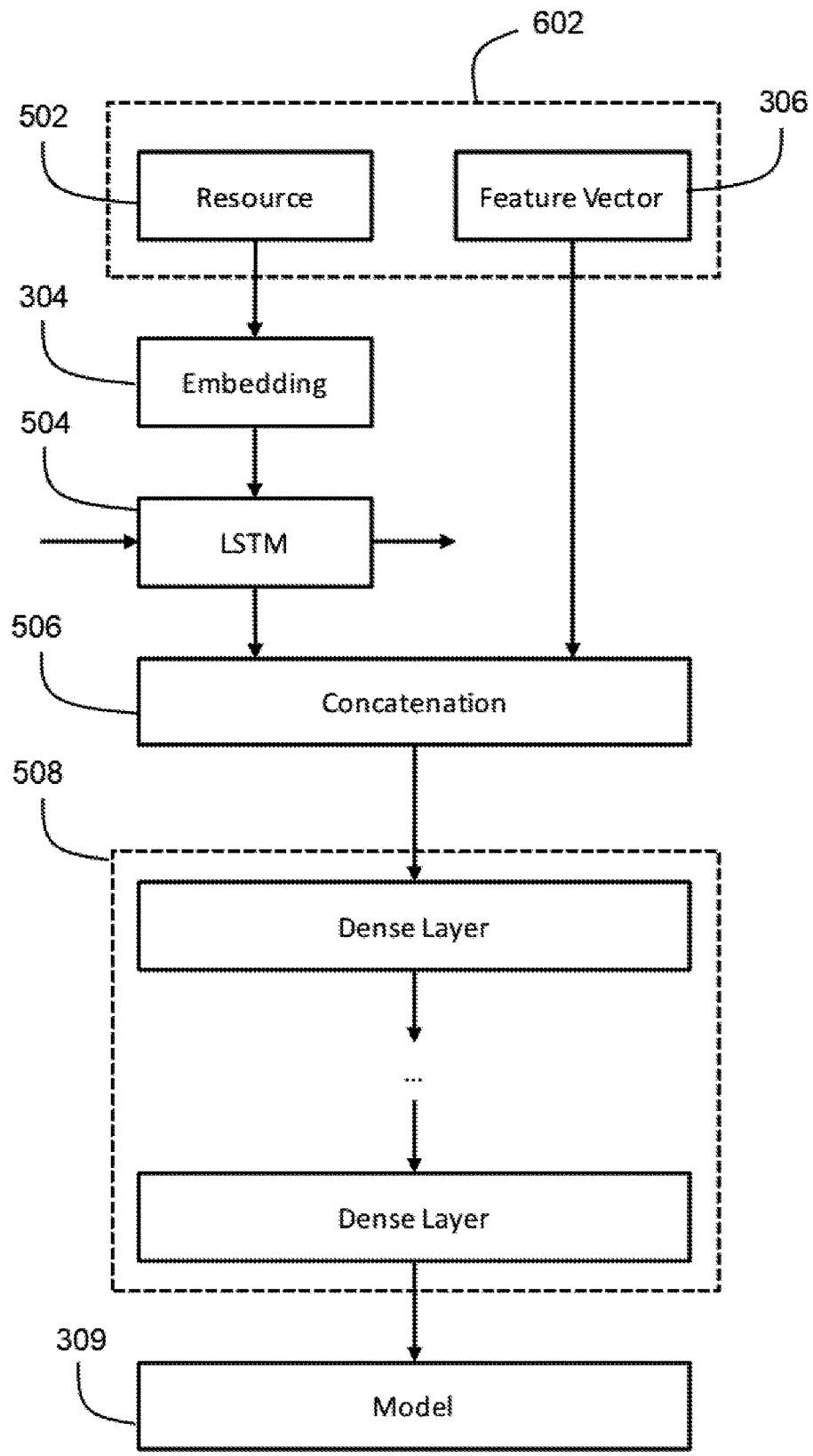
FIG. 6 shows a flow diagram for a neural network used to create a model for anomaly detection in accordance with an embodiment of the present invention.

FIG. 6 shows a flow diagram for a neural network used to create a model 309 for anomaly detection. The resources 502 in a change sequence from a dataset 602 can be embedded into an embedding vector 304 and fed to an LSTM cell 504 as previously described. The feature vector 306 and the output of the LSTM cell 504 can be concatenated, wherein the feature vector 306 has been one-hot encoded. The concatenated input vector 506 can then be fed into the dense layers 508, which output the model 309 for anomaly detection (based on the multinomial distributions—logits 510).

Use Model for Anomaly Detection:

Once the recurrent neural network is trained, the model 309 output by the neural network can be employed to detect changes to a network topology which are abnormal.

The model 309 may produce a multinomial distribution representing the prediction of the next change. This distribution can be used to calculate the likelihood of the observed change, and if the change is below a threshold, the change can be flagged as an anomaly.

In an example, there is a Kubernetes cluster which uses Kubernetes horizontal pod autoscaling on a deployment. There may be many replicas of the pods at any time, depending on the network requirements and rules, such as, but not limited to, CPU utilization (e.g., create a replica of a pod on a second node when CPU utilization of node reaches 75%).

Typically, an embedding method such as Node2Vec could differentiate between the replicas. However, using the method embodiment of the present invention, the KubeNode2Vec can determine the pods on the different nodes are replicas (of the first pod), even if the second node has never been seen before (e.g., using cluster autoscaler on Kubernetes).

Therefore, when creating an embedding vector for a pod, the KubeNode2Vec method can determine they are the same, and thus the embedding observations are obtained for the pod (with multiple replicas). This allows more information on the behavior of a pod to be stored in the embedding vector 304.

The neural network can thus be trained with embedding vectors 304 and the feature vectors 306 for changes (e.g., a replica being produced, a pod being spun up etc.). The model 309 output by the neural network can also predict, for example, the creation of pod replicas, regardless of the node the model 309 is using.

In another example, a recurrent neural network can be trained to learn change sequences of containers in a pod. Due to the general size of pods, the training material for the containers is much lower and take less time to train the recurrent neural network.

The changes in the containers of a single pod can be input to train the recurrent neural network and provide a prediction of the next change. For example, certain containers may be used more during certain times of the day. The recurrent neural network can thus learn how the pod functions under normal circumstances, and aid in the detection of anomalous behavior.

Alternatively, it may be desirable to detect anomalies in the nodes (hardware computing machines and/or virtual machines) of a cluster. In this case, the recurrent neural network can be trained to learn change sequences for the nodes. The model 309 output may thus be a distribution representing the prediction of changes for the nodes, and therefore anomalies (or chains of anomalies) for a node can be detected, possibly signaling hardware problems.

However, the use of embodiments of the present invention is not limited to pods, containers or nodes in the Kubernetes system. Embodiments of the present invention may also be used in, but are not limited to, a network of nodes, a network of virtual machines, a container based architecture etc.

In an example, the invention could be used in the context of creating a Key Performance Indicator (KPI). Anomalous topology changes may be used as a KPI by looking in some period and determining if the number of changes goes above a threshold of, for example, 0. Topology changes in fairly static environments may be indicative of a problem. Multiple metrics about the system may be used to determine that an anomalous topology change is causing errors and/or latency going up, or an anomalous topology change generally causes an unwanted behavior on metrics for topology members or underlying network metrics.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for training a recurrent neural network to create a model for anomaly detection in a topology of a network, the training method comprising:
    creating an embedding vector for each resource in the network based on applying a KubeNode2Vec method, based on a Kubernetes system, to the network, wherein the KubeNode2Vec method comprises of:
        collecting snapshots of the topology corresponding to the network;
        graphing scale nodes, edges and walks based on the snapshots;
        learning all features corresponding to results from the graphing by storing as a sampling strategy;
        initializing the walks from the graphing; and
        obtaining one or more feature vectors representing neighbors of each of the scale nodes and the walks using the sampling strategy;
    creating a feature vector from the one or more feature vectors for each change to a resource in the network based on one or more properties of a change;
    training a recurrent neural network with the embedding vectors and the feature vectors to create the model for anomaly detection in the topology of the network and wherein the recurrent neural network comprises:
        an input layer for receiving the embedding vectors;
        a sequence learning layer following the input layer;
        a concatenating layer for concatenating the feature vectors with an output of the sequence learning layer;
        one or more dense layers;
        a layer of logits is situated below the one or more dense layers; and
        an output layer to output the model for anomaly detection.

2. The method of claim 1, wherein the model for anomaly detection is used to create KPIs (key performance indicators) for changes to the topology of the network.

3. The method of claim 1, wherein one or more properties of the change comprises of:
    an entity type corresponding to the resource where the change was made;
    a change type; and
    a change time.

4. The method of claim 1, wherein creating the one or more feature vectors is based on one-hot encoding or one-cold encoding corresponding to the one or more properties of the change.

5. The method of claim 2, wherein the sequence learning layer is a LSTM (long short term memory) layer.

6. The method of claim 2, wherein the sequence learning layer is a GRU (gated recurrent unit) layer.

7. The method of claim 1, wherein training the recurrent neural network is based on sequence learning.

8. A system for training a recurrent neural network to create a model for anomaly detection in a topology of a network, the system comprising:
one or more computer processors;
one or more non-transitory computer readable storage media;
program instructions stored on the one or more computer readable storage media for execution by at least one of the one or more computer processors, the program instructions comprising the steps of:
creating an embedding vector for each resource in the network based on applying a KubeNode2Vec method, based on a Kubernetes system, to the network, wherein the KubeNode2Vec method comprises of:
collecting snapshots of the topology corresponding to the network;
graphing scale nodes, edges and walks based on the snapshots;
learning all features corresponding to results from the graphing by storing as a sampling strategy;
initializing the walks from the graphing; and
obtaining one or more feature vectors representing neighbors of each of the scale nodes and the walks using the sampling strategy;
creating a feature vector from the one or more feature vectors for each change to a resource in the network based on one or more properties of a change;
training a recurrent neural network with the embedding vectors and the feature vectors to create the model for anomaly detection in the topology of the network and wherein the recurrent neural network comprises:
an input layer for receiving the embedding vectors;
a sequence learning layer following the input layer;
a concatenating layer for concatenating the feature vectors with an output of the sequence learning layer;
one or more dense layers;
a layer of logits is situated below the one or more dense layers; and
an output layer to output the model for anomaly detection.

9. The system of claim 8, wherein the model for anomaly detection is used to create KPIs (key performance indicators) for changes to the topology of the network.

10. The system of claim 8, wherein the one or more properties of the change are one or more of:
an entity type corresponding to the resource where the change was made;
a change type; and
a change time.

11. The system of claim 8, wherein creating one or more feature vectors is based on one-hot encoding the corresponding to the one or more properties of the change.

12. The system of claim 9, wherein the sequence learning layer is a LSTM (long short term memory) layer.

13. The system of claim 9, wherein the sequence learning layer is a GRU (gated recurrent unit) layer.

14. The system of claim 8, wherein training the recurrent neural network is based on sequence learning.

15. A computer program product including a computer readable medium comprising software code portions, executable on a computing device, for performing a method for training a recurrent neural network to create a model for anomaly detection in a topology of a network, the computer program product comprising:
one or more non-transitory computer readable storage media and program instructions stored on the one or more non-transitory computer readable storage media, the program instructions comprising the steps of:
creating an embedding vector for each resource in the network based on applying a KubeNode2Vec method, based on a Kubernetes system, to the network, wherein the KubeNode2Vec method comprises of:
collecting snapshots of the topology corresponding to the network;
graphing scale nodes, edges and walks based on the snapshots;
learning all features corresponding to results from the graphing by storing as a sampling strategy;
initializing the walks from the graphing; and
obtaining one or more feature vectors representing neighbors of each of the scale nodes and the walks using the sampling strategy;
creating a feature vector from the one or more feature vectors for each change to a resource in the network based on one or more properties of a change;
training a recurrent neural network with the embedding vectors and the feature vectors to create the model for anomaly detection in the topology of the network and wherein the recurrent neural network comprises:
an input layer for receiving the embedding vectors;
a sequence learning layer following the input layer;
a concatenating layer for concatenating the feature vectors with an output of the sequence learning layer;
one or more dense layers;
a layer of logits is situated below the one or more dense layers; and
an output layer to output the model for anomaly detection.

16. The computer program product of claim 15, wherein the model for anomaly detection is used to create KPIs (key performance indicators) for changes to the topology of the network.

17. The computer program product of claim 15, wherein the change properties are one or more of:
an entity type corresponding to the resource where the change was made;
a change type; and
a change time.

18. The computer program product of claim 15, wherein program instructions to creating one or more feature vectors are based on one-hot encoding or one-cold encoding corresponding to the one or more properties of the change.

19. The computer program product of claim 16, wherein the sequence learning layer is a LSTM (long short-term memory) layer.

20. The computer program product of claim 16, wherein the sequence learning layer is a GRU (gated recurrent unit) layer.

* * * * *